Figures 3, 4:
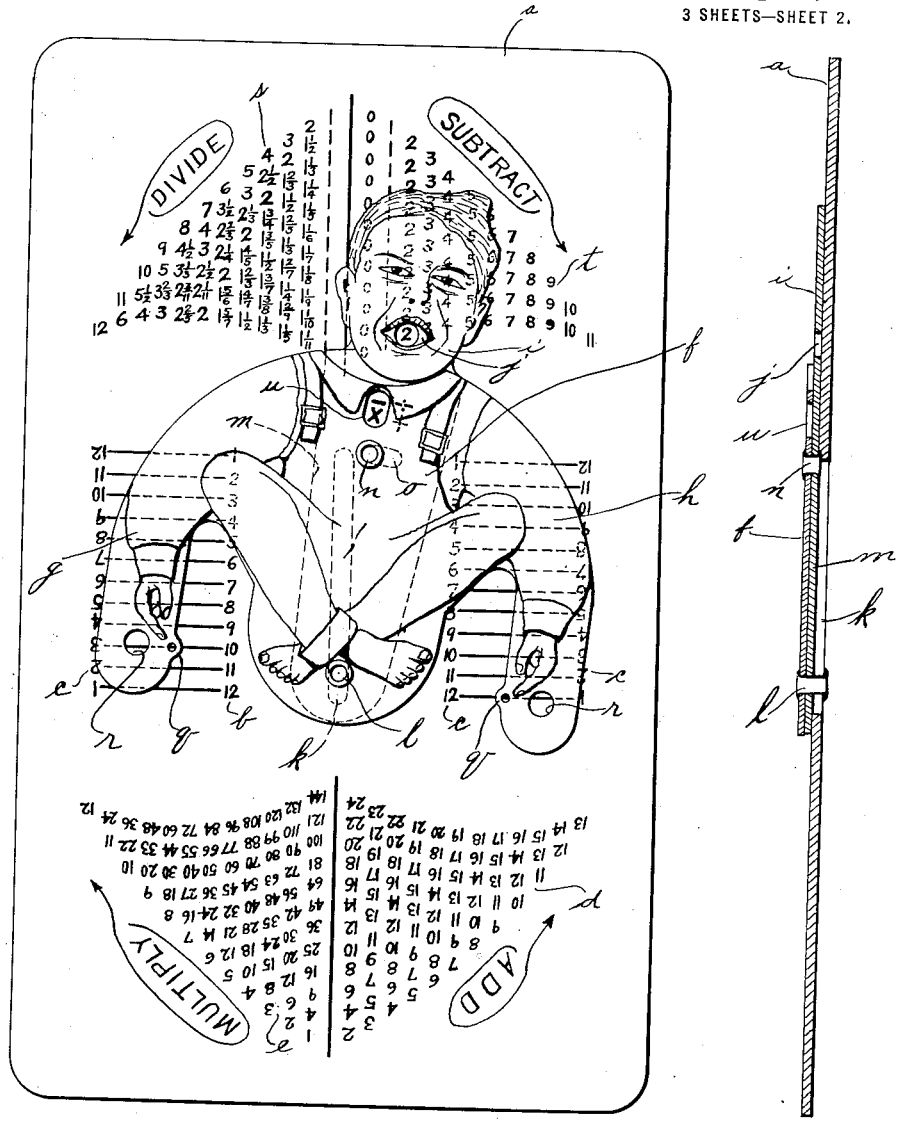

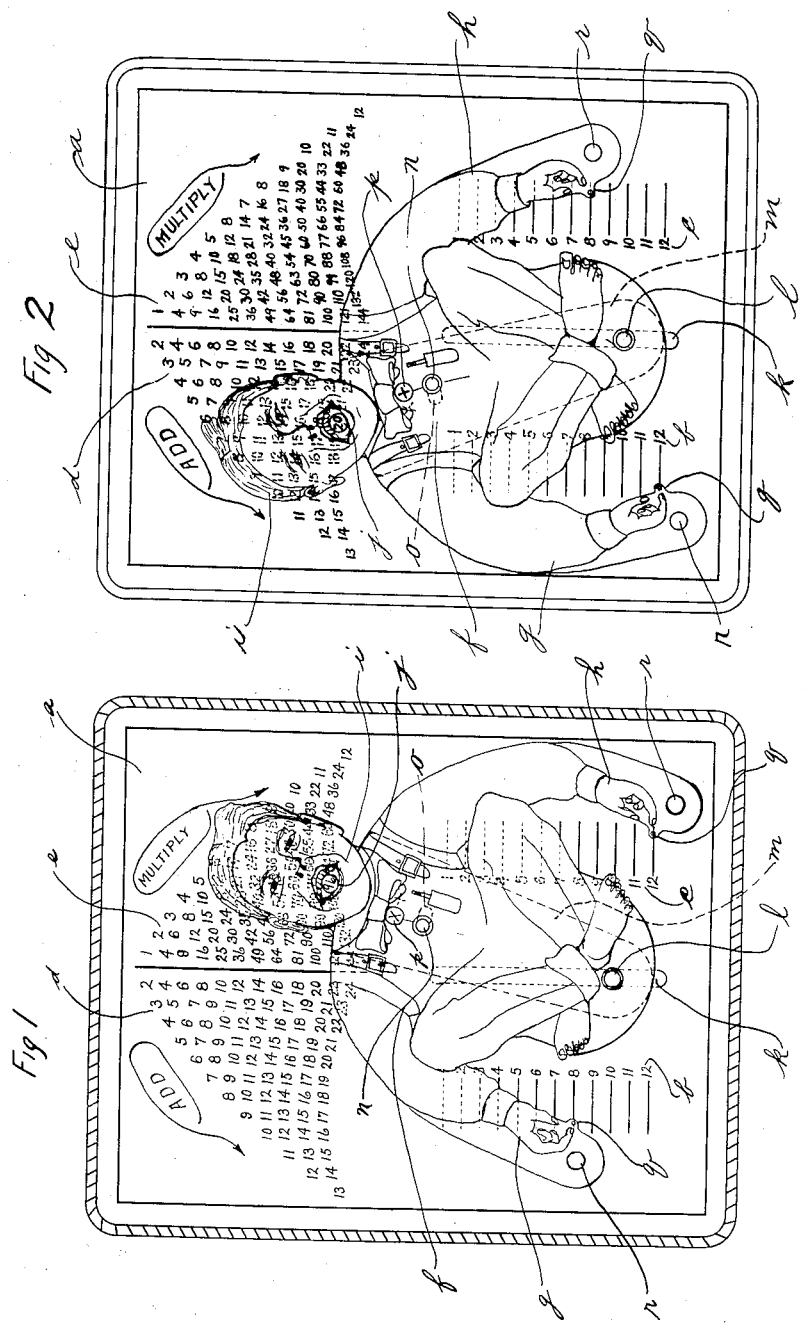

W. H. MATTHEWS.
COMPUTING DEVICE.
APPLICATION FILED DEC. 17, 1915.

1,238,800.

Patented Sept. 4, 1917.
3 SHEETS—SHEET 2.

INVENTOR.
William H. Matthews
BY Edward L. Reed
ATTORNEY.

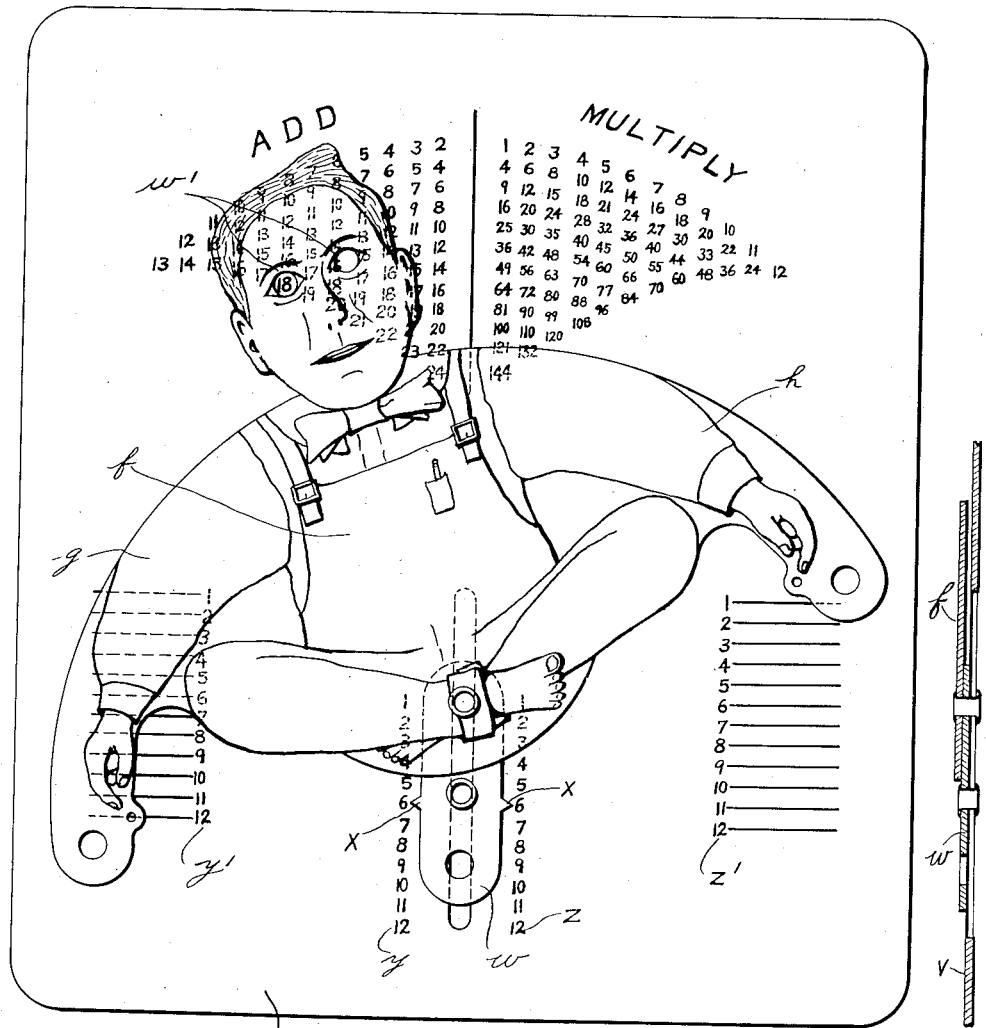

UNITED STATES PATENT OFFICE.

WILLIAM H. MATTHEWS, OF DAYTON, OHIO.

COMPUTING DEVICE.

1,238,800.  Specification of Letters Patent.  Patented Sept. 4, 1917.

Application filed December 17, 1915. Serial No. 67,302.

*To all whom it may concern:*

Be it known that I, WILLIAM H. MATTHEWS, a citizen of the United States, residing at Dayton, in the county of Montgomery and State of Ohio, have invented certain new and useful Improvements in Computing Devices, of which the following is a specification, reference being had therein to the accompanying drawing.

This invention relates to computing devices and the object of the invention is to provide a very simple and inexpensive device of this kind which will make a comparatively large number of computations of a simple character. To this end it is a further object of the invention to provide a device of this kind in which the computations will be made by moving an indicating device over a chart, the only moving part of the mechanism being the indicating device.

It is also an object of the invention to provide a device of this character with which computations of different kinds may be made without material alteration or adjustment. It is also an object of the invention to provide a computing device of this character in the form of a toy with the indicating device representing a boy, or other figure.

In the accompanying drawings, Figure 1 is a plan view of a computing device embodying my invention, showing the indicating device in a position to compute a multiplication; Fig. 2 is a similar view showing the indicating device in a position to compute additions; Fig. 3 is a further development of the device shown in Figs. 1 and 2, to enable it to compute divisions and subtractions as well as additions and multiplications; Fig. 4 is a sectional view taken centrally through the device of Fig. 3, with the head of the indicating device in a central position; Fig. 5 is a plan view of a slightly modified form of the invention, and Fig. 6 is a sectional view taken centrally through the lower part of the device of Fig. 5.

In carrying out my invention I provide a card, or chart, which may be made to represent a slate, or other device, if desired, and upon which I arrange a table of figures, together with two sets of figures. Mounted on this card, or chart, is an indicating device having three indicating parts. Two of these indicating parts are arranged to indicate selected figures in the respective sets of figures, these selected figures being the figures with which the computation is to be made. The third indicating part of the device is arranged to indicate on the table of figures that particular figure representing the result of the computation involving the two figures selected from the two sets of figures. Preferably, I place upon each chart two or more tables of figures and so construct the indicating device that it can be utilized to indicate the result of computations of different kinds involving figures selected from the two sets of figures, as for example, to indicate on one table the product of the two selected figures and to indicate on the other table the sum of the selected figures.

The invention may be embodied in various forms, and I have shown in Figs. 1 and 2 one form which is very satisfactory. As there shown, the chart comprises a card *a* which may be decorated to give it the appearance of a slate and on which are arranged two sets of figures *b* and *c*. The two sets of figures are here shown as identical and as arranged in parallel rows, each row consisting of the figures 1 to 12, inclusive. Arranged on the chart, preferably adjacent to the ends of the sets of figures *b* and *c*, are two tables of figures, *d* and *e*. Each of these tables comprises a plurality of rows of figures, preferably arranged substantially parallel one with the other, and as here shown, extending transversely to the sets of figures *b* and *c*. Each row of figures in each of the tables begins with a figure, or numeral, having a value greater by one unit (the arithmetical unit one) than the value of the first figure of the preceding row, and each row of figures contains a number of figures greater by one than the number of figures in the preceding row. As here shown each table is substantially in the form of a triangle, and the several figures comprising the initial figure of each row, constitute the hypotenuse of the triangle. The figures on the table *d* are of such value and are so arranged that on this table may be indicated the sum of any two figures which may be selected from the two sets of figures *b* and *c*, and, in the present arrangement of the chart, each figure of each row of figures in the table differs from the figure preceding it by the same number of units that it differs from the figure following it, this difference being, in the present arrangement, a single unit or 1. The second table *e* is similarly arranged and the figures there of are of such a character that the product of any two figures which may be selected from the sets of figures, *b* and *c*, may be indicated thereon. In this table also, each figure of each row differs from the figure immediately preceding it, by the same number of units that it differs from the figure immediately following the same, and in the present arrangement each figure of each row is a multiple of the initial figure of that row.

Mounted on the card, or chart, is an indicating device *f* which has a plurality of indicating parts and which is movable over the chart to bring these indicating parts into indicating relation with different figures of the two sets of figures and of the table, respectively. This indicating device may take any suitable form, but where the device is to be sold as a toy I prefer to make the indicating device in the form of a person, or figure of some kind, and in the present instance this device represents a boy seated with his legs crossed and his arms extending beyond his knees and forming indicating parts, as indicated at *g* and *h*. The head *i* of the boy constitutes the other indicating part, and in the arrangement shown in the Figs. 1 and 2 the mouth is represented as open and is provided with an opening *j* through which the figure to be indicated may be read. This indicating device is so mounted on the chart that it may be moved over the same in such a manner as to bring the indicating devices *g* and *h* into indicating engagement with any two selected figures in the sets of figures *b* and *c*, and to bring the indicating opening *j* into indicating relation with the corresponding figure on either one of the tables. Preferably, this is accomplished by mounting the device for both a sliding and a pivotal movement, and to this end I have provided the chart with a slot *k* arranged between and substantially parallel with the two sets of figures *b* and *c*, and have connected the indicating device with the chart by means of a stud, or rivet, *l*, which is slidably mounted in the slot *k*. In that embodiment of the device shown in Figs. 1 and 2, that part of the indicating device which is arranged in indicating relation to the tables of figures, the head of the boy, is movable from one position to another to enable it to be moved into indicating relation with the proper figure of either table, to indicate the sum or product of the selected figures. To this end I have provided the head with a supporting extension *m* which is mounted on the stud *l*, so as to be movable with the body of the indicating device as well as to have a limited movement relatively thereto. The movement of the head, relatively to the body, may be limited in any suitable manner, but this is preferably accomplished by a stud, or rivet, *n*, mounted in the one part and extending through a slot *o* in the other part of the device. The body of the device is provided with an opening *p* through which may be read marks on the support for the head, which indicate whether the head is in a position to add or to multiply. To make a computation with this device, the head is first adjusted according to the character of the computation. In Fig. 1 the head is adjusted to multiplying position. The device is then adjusted to bring the indicating parts, or arms, into a position to indicate, in the respective sets of figures *b* and *c*, the particular figures which are to be multiplied, such as 8 and 12. The movement of the indicating device into a position to indicate these figures will cause the third indicating part, or head, to be so positioned with relation to the table *d* that the figure which is visible through the opening *j* will be the product of the figures selected from the sets of figures *b* and *c*, which, as shown in Fig. 1, is the figure 96. The lower indicating parts, or arms, may make their indications in any suitable manner, but in the construction shown in Figs. 1 and 2, these indicating parts are somewhat larger and longer than the representations of the arms, as shown thereon, and are provided with projections *q*, arranged adjacent to the inner finger of the hand represented thereon, and each having a small opening through which may be seen a line, or scale, arranged adjacent to the respective figures of the two sets of figures. To facilitate the shifting of the parts, the indicating parts *g* and *h* are both provided with openings *r*, which enable the thumb, or finger, of the operator to secure a grip upon these parts.

In Fig. 3 of the drawings, I have shown a further development of the device and have added to the chart two additional tables, *s* and *t*, which will indicate the result of the division or subtraction, respectively, of the figures selected in the two sets of figures. The general arrangement of the figures of these tables is substantially similar to the arrangement of the figures of tables *d* and *e*. The additional tables *s* and *t* are preferably arranged at that end of the chart opposite the tables *d* and *e*. To enable the device to be readily operated with either pair of tables at the upper end thereof, I have duplicated the sets of figures *b* and *c* in a reverse position so that there is a set of figures *b* and a set of figures *c* which can be read, right side up, with either end of the chart uppermost. Further, the support for the head has been provided with four indicating marks instead of two, and an elongated opening *u* is provided in the body of the indicating device through which two of the marks are simultaneously visible, but one mark will refer to a table at one end of the chart and the other mark will refer to a table at the opposite end of the chart. Hence, no confusion will result. The manipulation of the indicating device to accomplish a division or a subtraction is the same as that to accomplish the multiplication above described. The lower indicating parts of the indicating device are moved into indicating relation to the figures involved in the computation, and this adjustment of the lower indicating parts serves to so position the upper indicating part that it will indicate the result of the computation.

In Figs. 5 and 6, I have shown a slight modification of the invention. As here shown, I use one of the lower indicating parts, or arms, of the indicating device $f$ to indicate one of the numerals with which the computation is to be made, but I use a separate indicating part to indicate the other of said numerals. To this end I have mounted on the chart, which is indicated by the reference numeral $v$, a slide plate $w$ on which is pivotally mounted the body portion $f$ of the indicating device. This slidable plate $w$ constitutes an indicating part of the indicating device, and to this end it is provided on its opposite sides with pointers $x$. The chart is provided with four sets of figures instead of two, as was the case in the device of Figs. 1 and 2. Two of these sets of figures, $y$ and $z$, are arranged on opposite sides of the slidable plate $w$, while the other two sets of figures, $y'$ and $z'$, are arranged much nearer the lateral edges of the chart and near the ends of the indicating arms $g$ and $h$. Thus, to make a computation the slidable plate $w$ is moved into indicating relation to the selected figure of the sets of figures $y$ and $z$, and the body of the device is then tilted to bring the indicating arm into indicating relation with the selected figure either of the set of figures $y'$, or the set of figures $z'$, according as to whether the computation is to be made by addition or multiplication. These adjustments serve to place the upper indicating device in a position to indicate on the selected table, a figure representing the result of the computation.

In Fig. 5 I have also shown the upper indicating part of the indicating device as fixed with relation to the body of that device, and instead of the adjustment which is provided in Figs. 1, 2 and 3, I provide two indicating openings which are spaced a proper distance apart to produce the same result as the adjustment. In that form of the invention in which the indicating device represents the figure of a person openings are provided in the eyes, as shown at $w'$, the one opening indicating the result on the addition table and the other opening indicating the result on the multiplication table.

The operation of the device has been fully described in connection with the description of the several parts thereof, and it will be apparent that I have provided a computing device of a very simple character having few moving parts and which is very easy of manipulation. Further, it will be apparent that the device is of such a character that it can be produced at a very low cost and sold as a toy, and when so sold will have value both as an educational device and as an amusement device.

While I have shown and described certain embodiments of my invention, I wish it to be understood that I do not care to be limited to the details shown and described as various modifications will occur to a person skilled in the art.

Having now fully described my invention, what I claim as new, and wish to secure by Letters Patent, is:—

1. In a computing device, a chart having a table of figures arranged in predetermined relation and also having two sets of figures arranged in predetermined relation to each other and to the figures of said table, and a device adapted to be moved over said chart and having parts to indicate selected figures in the respective sets of figures and having another part arranged in a normally fixed position relatively to the first-mentioned parts to indicate in said table a figure which will represent the result of a computation involving the selected figures in said sets of figures.

2. In a computing device a chart having thereon a plurality of figures and an indicating device mounted for bodily movement over said chart, said indicating device having two indicating parts rigidly secured thereto and arranged to be adjusted by the bodily movement of said indicating device to indicate, respectively, figures on said chart, said indicating device also having a third indicating part adapted to be adjusted by the bodily movement of said indicating device to indicate a figure on said chart representing the result of a computation involving the figures indicated by the first-mentioned parts.

3. In a computing device a chart having a table of figures, and also having two sets of figures arranged side by side, an indicating device mounted on said chart for sliding movement between said sets of figures and having pivotal movement in a plane parallel with the face of said chart, said indicating device having parts rigidly secured thereto and arranged to be moved by the combined sliding and pivotal movement of said indicating device into positions to indicate figures in the respective sets of figures, said indicating device also having a third indicating part arranged to be adjusted by the movement of said indicating device to indicate a figure in said table of figures representing the result of a computation involving the figures indicated by the first-mentioned parts.

4. In a computing device, a chart, having a table of figures arranged in predetermined relation, and also having two sets of figures arranged in predetermined relation to each other and to the figures of said table, a device mounted on said chart for both sliding and pivotal movement and having two parts rigidly connected one to the other and adapted to be adjusted by the combined sliding and pivotal movement of said device to indicate selected figures in the respective sets of figures, and having another part arranged in a normally fixed position relative to the first-mentioned parts to indicate in said table a figure representing the result of a computation involving figures selected from said sets of figures.

5. In a computing device, a chart having a table of figures arranged in predetermined relation, and also having two sets of figures arranged in substantially parallel rows and in predetermined relation to each other and to the figures of said table, and an indicating device slidably mounted on said chart for bodily movement along a line extending between said sets of figures and having pivotal movement about an axis remote from said table of figures, said indicating device having parts arranged on opposite sides thereof to indicate selected figures in the respective sets of figures and having a part at that end remote from said axis to indicate in said table a figure representing the result of a computation involving figures selected from said sets of figures.

6. In a computing device, a chart having a guideway, and having a table of figures near one end of said guideway, said chart also having two sets of figures arranged in rows on the opposite sides of said guideway, and an indicating device mounted for bodily movement along said guideway and for pivotal movement in a plane parallel with the face of said chart, said indicating device having parts arranged on opposite sides of said guideway to indicate selected figures in said rows of figures and having a part projecting beyond said sets of figures to indicate in said table a figure representing the result of a computation involving figures selected from said sets of figures.

7. In a computing device, a chart having a slot therein and having a table of figures arranged near one end of said slot, said chart also having two sets of figures arranged in rows on the opposite sides of said slot, an indicating device, and a stud secured to said indicating device and extending through said slot, whereby said indicating device is capable of both sliding and pivotal movement relative to said slot, said indicating device having parts to indicate selected figures in the respective sets of figures and having another part to indicate in said table of figures a figure representing the result of a computation involving figures selected from said sets of figures.

8. In a computing device, a chart, having a guideway and having a table of figures arranged near one end of said guideway, said chart also having two sets of figures arranged on opposite sides of said guideway, an indicating device mounted for sliding movement along said guideway and for pivotal movement, said device having arms arranged on opposite sides of said guideway to indicate selected figures in the respective sets of figures, said device also having a part arranged to move over said table of figures and provided with a part to indicate in said table a figure representing the result of a computation involving those figures of said sets of figures which are indicated by said arms.

9. In a computing device, a chart having a guide-way, said chart having two sets of figures arranged on opposite sides of said guide-way and also having a plurality of tables of figures, an indicating device mounted for movement along said guide-way and for pivotal movement, and having parts arranged on opposite sides of said guide-way to indicate selected figures on said sets of figures and having an adjustable part movable into one position to enable it to indicate in one of said tables of figures a figure representing the result of a computation involving figures selected from said sets of figures, and movable into another position to enable it to indicate in the other of said tables a figure representing the result of another computation involving figures selected from said sets of figures.

10. In a computing device, a chart having a guideway, two tables of figures, and two sets of figures arranged on opposite sides of said guideway, and an indicating device having a stud slidably mounted on said guideway, having parts extending on opposite sides of said guideway, to indicate selected figures in said sets of figures, and having another part pivotally mounted on said stud and movable into one position to enable it to indicate in one of said tables a figure representing the result of a computation involving figures selected from said sets of figures, and movable into another position to enable it to indicate in the other table a figure representing the result of another computation involving figures selected from said two sets of figures.

11. In a computing device, a chart having a guideway, two tables of figures, and two sets of figures arranged on opposite sides of said guideway, and an indicating device having a stud extending into said guideway, and having parts to indicate selected figures in said sets of figures, and having another part pivotally mounted on said stud for movement relatively to the first-mentioned parts and movable into one position to enable it to indicate in one of said tables a figure representing the result of a computation involving figures selected from said sets of figures and movable into another position to enable it to indicate in the other table a figure representing the result of another computation involving figures selected from said two sets of figures, said indicating device having an opening therein and the last mentioned part of said indicating device having marks alternately visible through said opening to indicate for which computation said part is adjusted.

12. In a computing device a chart having thereon a plurality of figures, and an indicating device mounted for movement over said chart, said indicating device having two indicating parts arranged in fixed relation one to the other and having a third indicating part adjustably connected with the first mentioned indicating parts, said indicating parts being so arranged with relation one to the other that when said indicating device has been moved into a position to cause two of said parts to indicate selected figures on said chart the other indicating part will have been moved into a position to indicate a figure on said chart representing a computation involving the said selected figures.

13. In a computing device a chart having thereon a plurality of figures and an indicating device mounted for bodily movement over said chart, said indicating device having a plurality of indicating parts arranged in normally fixed relation one to the other, the relation of said parts being such that said indicating device may be adjusted to cause two of said parts to indicate figures in said chart and another of said parts to indicate figures in said chart representing the result of a computation involving the figures indicated by the first-mentioned parts.

14. In a computing device a chart having thereon a plurality of groups of figures and an indicating device mounted for bodily movement over said chart, said indicating device having a plurality of indicating parts arranged in normally fixed relation one to the other, the relation of said parts being such that said indicating device may be adjusted bodily to cause two of said parts to respectively indicate figures on two of said groups of figures, and to cause another of said parts to indicate a figure on a third group of figures representing the result of a computation involving the first-mentioned parts.

15. In a computing device a chart having thereon a plurality of figures and an indicating device mounted for bodily movement over said chart, said indicating device having a plurality of indicating parts arranged in normally fixed relation one to the other, the relation of said parts being such that said indicating device may be adjusted to cause two of said parts to indicate figures on said chart and another of said parts to indicate figures on said chart representing the result of a computation involving the figures indicated by the first-mentioned parts, one of said indicating parts being adjustable relatively to the other indicating parts to cause figures to be indicated which will represent the results of computations of different kinds.

16. In a computing device a chart having thereon a plurality of groups of figures and an indicating device mounted for bodily movement over said chart, said indicating device having a plurality of indicating parts arranged in normally fixed relation one to the other, the relation of said parts being such that said indicating device may be adjusted bodily to cause two of said parts to respectively indicate figures on two of said groups of figures, and to cause another of said parts to indicate a figure on a third group of figures representing the result of a computation involving the first-mentioned parts, the last-mentioned indicating part being adjustable relatively to the first-mentioned indicating parts to cause it to indicate a figure on another group of figures which will represent a computation of a different kind.

17. In a computing device, a chart having thereon a plurality of figures and an indicating device mounted for bodily movement over said chart, said indicating device having a plurality of indicating parts, two of said parts being mounted in permanently fixed relation one to the other, and another indicating part being adjustable relatively to the first-mentioned indicating parts, the arrangement of said indicating parts being such that when said indicating device as a whole has been adjusted to cause the first-mentioned indicating parts to indicate selected figures on said chart, the last-mentioned indicating part will indicate a figure on said chart representing a computation involving the figures selected by the first-mentioned indicating parts.

18. In a computing device a chart having thereon a plurality of figures and an indicating device mounted on said chart for both sliding and pivotal movement, said indicating device having a plurality of indicating parts arranged in normally fixed relation one to the other, and so positioned relatively one to the other that by imparting bodily movement to said indicating device, two of said indicating parts may be caused to indicate selected figures on said chart, and another of said indicating parts may be caused to indicate a figure on said chart representing the result of a computation involving the figures indicated by the first-mentioned indicating parts.

19. In a computing device a chart having thereon a plurality of figures and an indicating device mounted on said chart for both sliding and pivotal movement, said indicating device having a plurality of indicating parts arranged in normally fixed relation one to the other, and so positioned relatively one to the other that by imparting bodily movement to said indicating device, two of said indicating parts may be caused to indicate selected figures on said chart, and another of said indicating parts may be caused to indicate a figure on said chart representing the result of a computation involving the figures indicated by the first-mentioned indicating parts, one of said indicating parts being adjustable relatively to the other indicating parts to cause the adjustable indicating part to indicate figures on said chart representing the results of computations of different kinds.

20. In a computing device a chart having thereon a plurality of figures, an indicating device having a plurality of indicating parts arranged in normally fixed relation one to the other, means for pivotally connecting said indicating device with said chart, said connecting means being slidably mounted on said chart, the indicating parts of said device being so arranged that when two of said parts have been moved into positions to indicate selected figures on said chart a third indicating part will have been moved into a position to indicate a figure on said chart representing the result of a computation involving the figures indicated by the first mentioned parts.

In testimony whereof, I affix my signature hereto.

WILLIAM H. MATTHEWS.